(No Model.) 2 Sheets—Sheet 1.

G. P. A. GUNTHER.
AQUARIUM.

No. 460,809. Patented Oct. 6, 1891.

Witnesses:
O. V. Groupe.
R. Schleicher.

Inventor
George P. A. Gunther
by his Attorneys
Howson & Howson (No Model.) 2 Sheets—Sheet 2.
G. P. A. GUNTHER.
AQUARIUM.
No. 460,809. Patented Oct. 6, 1891.
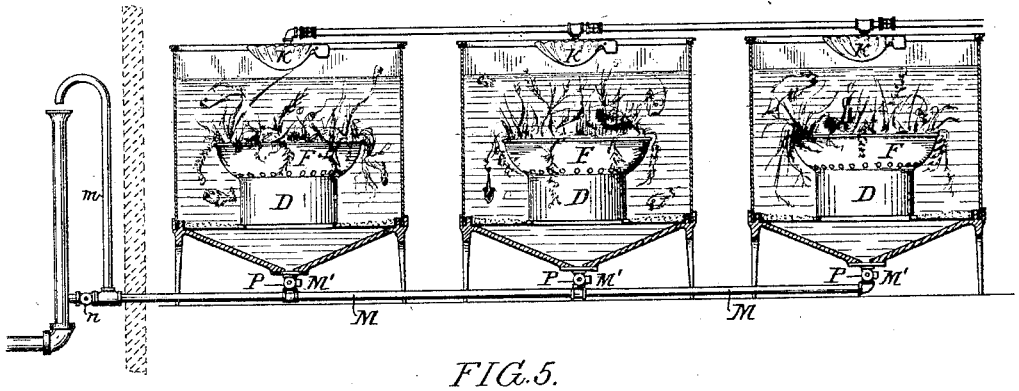
FIG. 4.
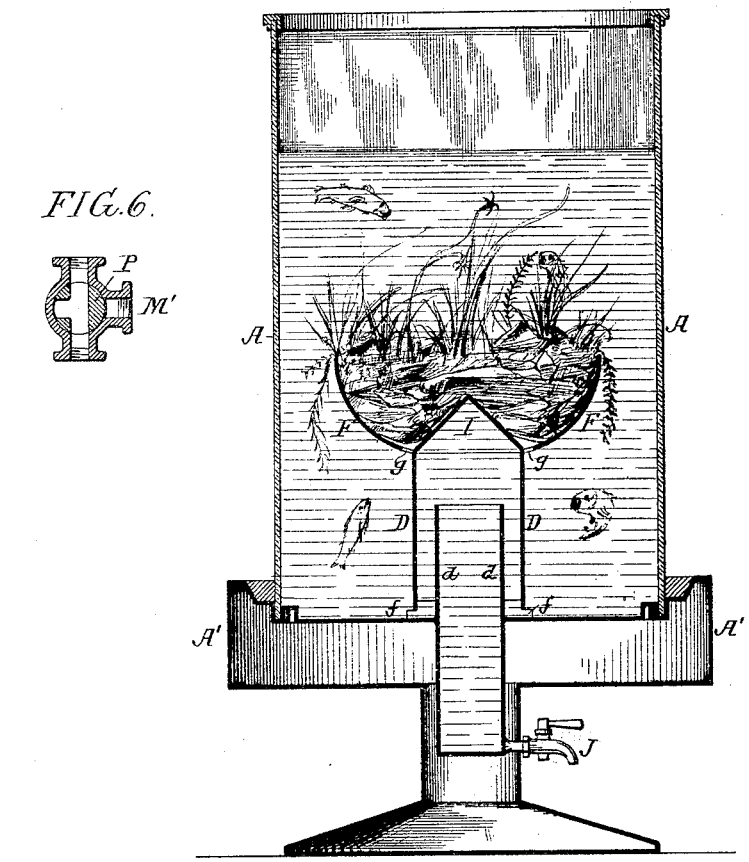
FIG. 5.
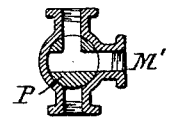
FIG. 6.
FIG. 7.
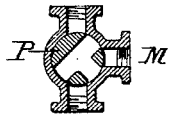
FIG. 8.
Witnesses:
A. V. Groupe.
R. Schleicher.
Inventor:
George P. A. Gunther
by his Attorneys
Howson & Howson
THE NORRIS PETERS CO., PHOTO-LITHO., WASHINGTON, D. C.

UNITED STATES PATENT OFFICE.

GEORGE P. A. GUNTHER, OF NEW YORK, N. Y.

AQUARIUM.

SPECIFICATION forming part of Letters Patent No. 460,809, dated October 6, 1891.

Application filed July 25, 1890. Serial No. 359,880. (No model.)

*To all whom it may concern:*

Be it known that I, GEORGE P. A. GUNTHER, a citizen of the United States, and a resident of New York city, New York, have invented certain Improvements in Aquariums, of which the following is a specification.

One object of my invention is to so construct an aquarium that the conditions under which the fish are kept in confinement are much the same as they would enjoy in their native haunts, a further object being to provide for the automatic cleansing of the aquarium, either by the overflow-water or by draining or partially draining the aquarium, and a still further object being to effectively combine a series of tanks or aquariums. These objects I attain in the manner hereinafter set forth, reference being had to the accompanying drawings, in which—

Figure 1:
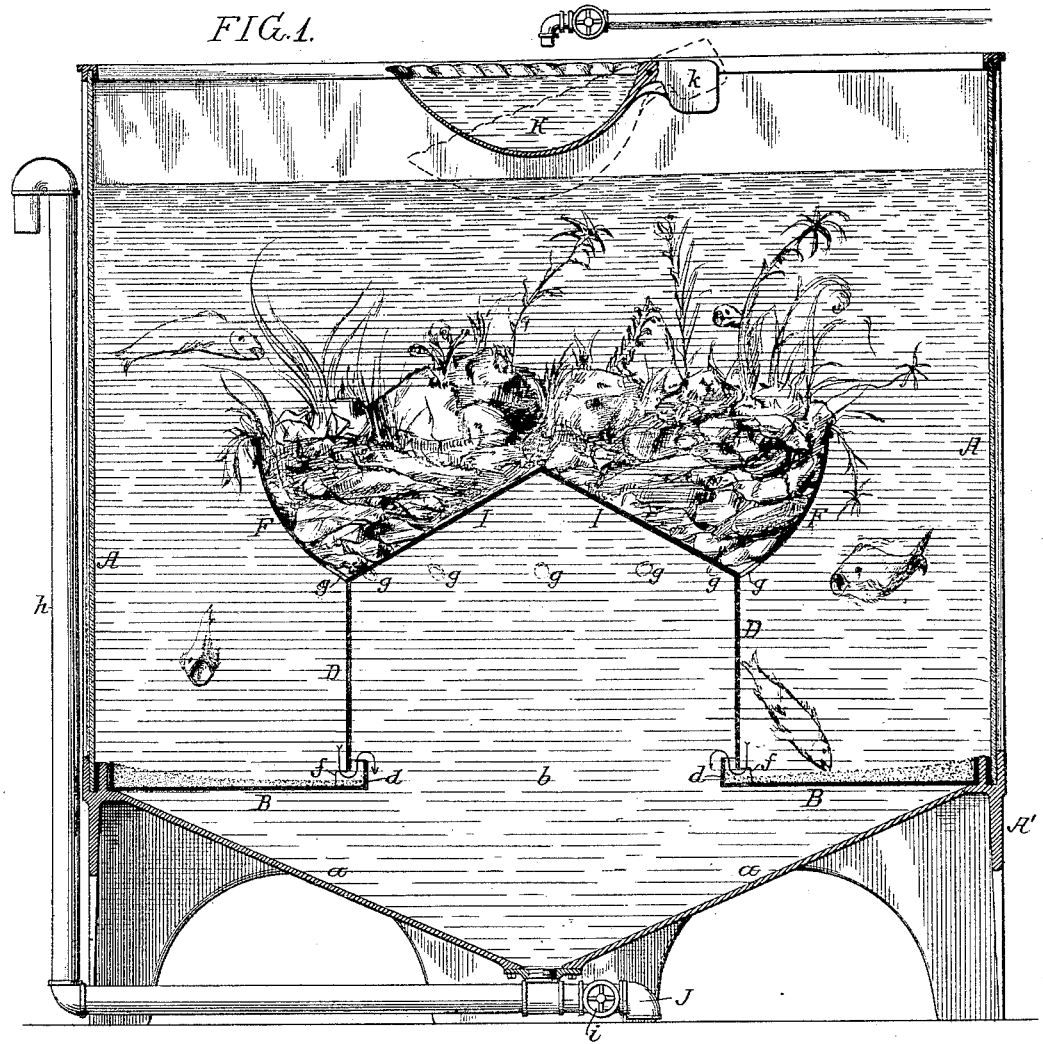
Figure 2:
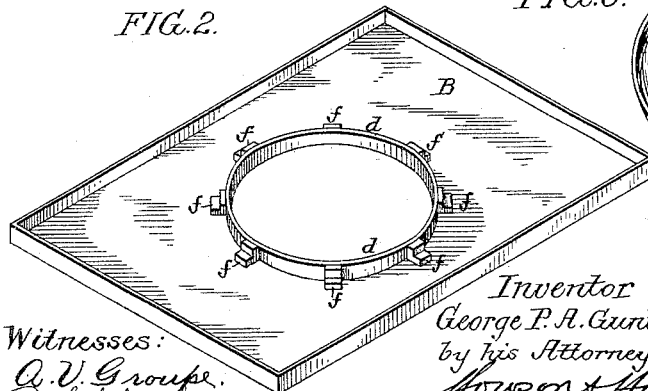
Figure 3:
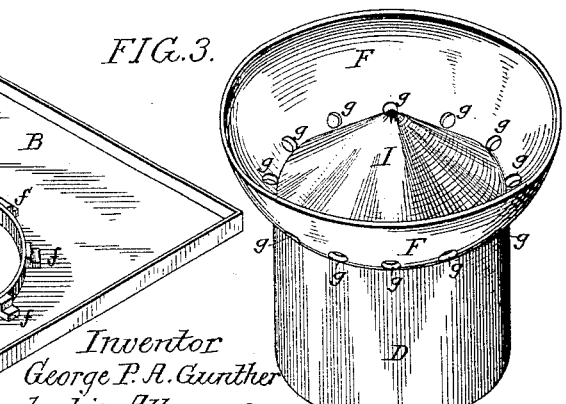

Figure 1 is a sectional view of an aquarium constructed in accordance with my invention. Figs. 2 and 3 are detached perspective views, on a smaller scale, of parts of said aquarium. Fig. 4 is a view showing a series of aquariums combined and connected in accordance with my invention. Fig. 5 is a view of another form of aquarium embodying the invention; and Figs. 6, 7, and 8 are detached views of valves used in connection with the series of aquariums.

In Fig. 1, A represents the casing of the aquarium-tank, the upper portion of which is composed in whole or in part of glass. In the base A' of the tank is a central depression $a$, tapering to a contracted outlet at the bottom, and this depression is covered by a tray B, which has a central opening $b$, surrounded by a wall or flange $d$. Outside of this flange $d$ are a series of projecting step-like lugs $f$, on which rests the cylindrical base or support D of a bowl or basin F, in the bottom of which, adjacent to the cylindrical support of the same, is a series of openings $g$. Within the basin or bowl F is a central conical projection or mound I, and around this mound and within the bowl are placed stones, rocks, and aquatic plants, while in the tray B is a supply of sand. The aquarium thus presents to the fish confined in it the same conditions which in their free state they would enjoy in a pool having rocky sides and a pebbly and sandy bottom. Hence the fish can be kept in good condition in captivity for an indefinite period, the constant changing of the water in the aquarium being effected by providing the tank with an overflow-pipe $h$, communicating with the contracted outlet in the bottom of the tapering depression $a$ in the base of the tank, this construction providing for a discharge of the water from the bottom of the tank as fast as fresh water is added thereto and the flow of water providing for the automatic cleansing of the tank in the manner set forth in my patent of November 19, 1889.

In no part of the tank does the water remain stagnant, for as the water flows from the contracted outlet in the bottom of the tank there is a flow from the sides of the tank across the sand in the tray B and toward and under the lower edge of the cylindrical support D for the bowl F, the water rising inside of this cylindrical support and passing over the flange $d$ and down through the central opening of the tray. Water at the same time flows downward from the bowl through the openings $g$ in the bottom of the same, so that not only are the contents of the bowl kept clean, but fish sediment is also prevented from accumulating on the sand in the tray B.

I have provided the outlet at the bottom of the tank with a discharge branch J, having a suitable valve $i$, on opening which the water can be drained or partially drained from the tank when desired, this flow also serving to cleanse the tank, for any sedimentary deposits upon the tapered bottom of the tank which are of such character as to resist the mild cleansing flow caused by the overflow-pipe will be dislodged and removed by the much more violent flow which results when the valve in the drain-pipe is opened. As, in many cases, the flow of water available for supplying the tank is not sufficient to cause such force in the overflow as to provide even a mild cleansing current through the tank, I mount in the upper portion of the tank a pivoted receptacle K, having a counter-weight $k$ of such character that it will almost but not quite counterbalance the weight of the receptacle and its load of water, so that when the receptacle is filled its weight will preponderate and it will tip so as to discharge its contents into the tank and then resume its normal position, the discharge of this comparatively large volume of water into the tank causing such an overflow from the same for a short time as to insure the desired cleansing current through the tank.

Where a series of aquariums is used, I prefer to connect the series by means of a common pipe M, having overflow m and drainage-outlet n, so that all of the tanks may discharge through this single overflow or may be drained through this single pipe. It is preferable, also, to provide for draining each tank independently when desired, and the most convenient method of effecting this is to provide for each tank a compound valve P in the nature of a multiple-way cock, which can be turned so as to connect the tank with the main drain-pipe, as in Fig. 6, or so as to cut off communication between said pipe and the tank, and provide for the draining of the tank through a special discharge branch M', as in Fig. 7, or so as to cut off the tank from both pipes, as in Fig. 8. In this case the overflow branch m of the drain-pipe and the main drainage-valve n may be carried outside of the room or apartment in which the aquariums are situated, as shown in Fig. 4.

In Fig. 5 I have illustrated my invention as applied to an aquarium the body of which consists of a simple cylinder of glass, the features constituting the subject of my invention being in this case, however, the same as in the other tanks shown and described.

Having thus described my invention, I claim and desire to secure by Letters Patent—

1. The combination of the tank having an outlet-opening, the elevated bowl or basin, and its hollow support surrounding the outlet-opening and elevated to permit the water to flow under it, said bowl or basin also having discharge-openings in the bottom of the same, substantially as specified.

2. The combination of the tank with the elevated bowl or basin and a tray located in the lower portion of the tank, said tray having in the center beneath said elevated bowl an outlet-opening with the surrounding wall or flange, substantially as and for the purpose set forth.

3. The combination of the tank with the tray located in the bottom of the tank and having an outlet-opening with surrounding wall or flange, and an elevated bowl or basin having a hollow support mounted above the bottom of the tray and surrounding the opening therein, substantially as specified.

4. The combination of the series of fish-tanks or aquariums and a discharge-pipe common to the series and having an upwardly-projecting overflow branch and a valved drain-pipe, substantially as specified.

In testimony whereof I have signed my name to this specification in the presence of two subscribing witnesses.

GEO. P. A. GUNTHER.

Witnesses:
EUGENE ELTERICH,
HARRY SMITH.